May 3, 1966 J. T. BOAG 3,249,277
ELECTRICAL APPARATUS
Filed Sept. 13, 1963
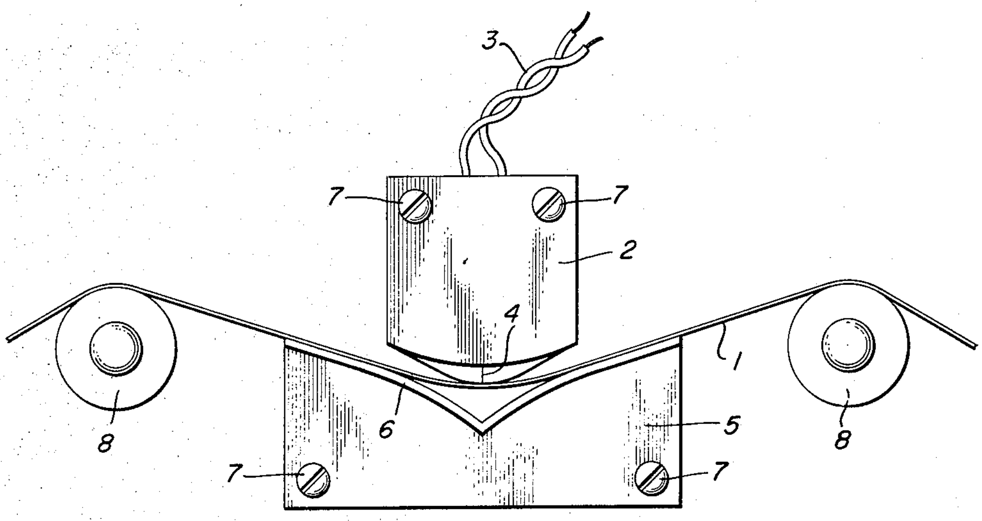
INVENTOR.
JAMES T. BOAG
BY Arthur H. Swanson
ATTORNEY.

United States Patent Office 3,249,277
Patented May 3, 1966

3,249,277
ELECTRICAL APPARATUS

James T. Boag, Littleton, Colo., assignor to Honeywell Inc., a corporation of Delaware Filed Sept. 13, 1963, Ser. No. 308,766
3 Claims. (Cl. 226—196)

The present invention relates to magnetic tape recording. More specifically, this invention relates to tape support apparatus.

An object of the present invention is to provide a new and novel tape support means.

In the field of magnetic tape recording and reproducing, it is desirable to maintain a moving storage tape in a dynamically controlled state during a signal recording or reproducing operation by a magnetic head with respect to the tape. Specifically, it is desirable that the motion of the tape is free from disturbances which would affect the operative association between the magnetic head and the storage tape. A significant disturbance arises from a resonant vibration or "flutter" of the unsupported lengths of the storage tape. The vibration of the storage tape is effective to distort the information signals handled by the magnetic head and tape. In order to accurately record or playback information signals, it is desirable that the "flutter" frequencies are inhibited from the frequency band included in the information signals.

Accordingly, it is another object of the present invention to provide a new and novel tape support for producing a dynamically stable state in a moving storage tape.

A further object of the present invention is to provide a new and novel tape support operative to inhibit objectionable flutter from a moving storage tape without interfering with an operative association between a magnetic head and a storage tape.

A still further object of the present invention is to provide a new and novel tape support, as set forth herein, having simple operation and construction.

In accomplishing these and other objects, there has been provided, in accordance with the present invention, a tape support having a rigid block with tape supporting surfaces in the form of a pair of curves having a common intersection. The surfaces are covered with low friction coating to provide a suitable tape engaging surface for a moving storage tape. The block is positioned adjacent to a gap in a magnetic head with the curved surfaces arranged to contact a storage tape on an opposite surface of the tape from that contacted by the magnetic head. The intersection of the curved surfaces is spaced from the magnetic head gap to provide a proper operative association between the storage tape and head gap.

A better understanding of the present invention may be had from the following detailed disclosure when read in connection with the accompanying drawing in which the single figure is a pictorial representation of a tape support embodying the present invention.

Referring to the single figure drawing, there is shown a new and novel tape support embodying the present invention. An information signal storage tape 1 is arranged to pass across a magenetic head 2. The magnetic head 2 is arranged to be connected to associated equipment by wires 3. An operative gap 4 is arranged to contact the tape 1 to provide either a recording or playback operation for information signals with respect to the signal storage surface of the tape 1. A rigid non-magnetic support block 5; e.g., aluminum, is arranged adjacent to the gap 4 and positioned on the opposite side of the tape 1 therefrom. An outer surface 6 of the block 5 is arranged in the form of a pair of similar curved surfaces. These surfaces have a common intersection at a spatial position in front of the gap 4. This intersection is spaced from the gap 4 by a distance which is dependent on the radius of curvature of the surfaces comprising surface 6. This distance is selected to provide a non-interfering relationship between the block 5 and the gap 4 with respect to the operative association of the gap 4 and the tape 1.

The outer surface 6 of the block 5 is provided with a low-friction coating 7; e.g., teflon, to provide a suitable support surface for the moving tape 1. The block 5 and head 2 are attached to an associated tape transport apparatus (not shown) by mounting screws 7. The tape 1 is supported outside of the surface of the block 5 by guide rollers 8, which rollers are also effective to position the tape 1 against the head.

In operation, the support means of the present invention is effective to reduce the unsupported length of the recording tape in the vicinity of the gap 4. This decrease in the unsupported tape length is effective to raise the resonant frequency of the tape 1 in response to induced vibrations from a tape transport. The unsupported length is measured from the gap 4 to the point of contact of the tape 1 on the low-friction surface 7. As an example, this unsupported length may be arranged to be .1" which would raise the tape resonance above five thousand cycles per second to provide an improved operation for information signals below that frequency. Further, the additional tape support provided by the surface 7 is effective to dampen the movement of tape 1 to attenuate other vibratory effect. The spacing of the intersection of the curved surfaces of the block 5 from the gap 4 is effective to eliminate any effect of the presence of the block 5 upon the operative relation between the gap 4 and the tape 1. Thus, the tape 1 is supported with a minimal unsupported length without interfering with the playback or recording process.

Accordingly, it may be seen that there has been provided, in accordance with the present invention, a tape support for reducing the unsupported length of a signal storage tape in the vicinity of a magnetic head associated with the tape without interfering with the operative association of the head and storage tape.

What is claimed is:

1. A tape support for use in association with a magnetic head comprising a rigid non-magnetic support block, a pair of tape contacting surfaces, said surfaces being arranged as inwardly directed arcuate curves having similar radii and a common intersection, and means for fastening said block with respect to a magnetic head gap to contact the opposite surface of tape from said gap and having said intersection spaced from said gap while being substantially aligned therewith.

2. A support for a moving information storage web member having an operative association with an information signal responsive means comprising a rigid support block, a pair of web member contacting surfaces on said block, said surfaces being arranged as inwardly directed arcuate curves having a common intersection, a low-friction coating on said surfaces and fastening means operative to position said block whereby said surfaces contact the opposite side of said web member from said responsive means and said intersection is substantially aligned with an operative portion of said responsive means.

3. A support as set forth in claim 2 wherein said arcuate curves have similar radii.

References Cited by the Examiner

UNITED STATES PATENTS

| | | | |
|---|---|---|---|
| 2,837,330 | 6/1958 | Lawrance et al. | 226—95 |
| 2,990,990 | 7/1961 | Wilkins et al. | 226—97 |

FOREIGN PATENTS

| | | |
|---|---|---|
| 907,975 | 10/1962 | Great Britain. |
| 941,762 | 11/1963 | Great Britain. |

ROBERT B. REEVES, *Primary Examiner.*

RAPHAEL M. LUPO, *Examiner.*

C. AOUSSAT, *Assistant Examiner.*